US006376558B1

(12) United States Patent
Bahner et al.

(10) Patent No.: US 6,376,558 B1
(45) Date of Patent: Apr. 23, 2002

(54) METHOD OF PRODUCING A POROUS PASTE, ESPECIALLY A POROUS PLASTER SLURRY, AND A MIXER FOR PREPARING SUCH PASTE OR SLURRY

(75) Inventors: Friedrich Bahner, Rotenburg; Kurt Braun, Ludwigsau-Friedlos; Helmut Eidam, Schenklensfeld; Horst Hose, Kassel; Karl Maurer, Bad Hersfeld; Frank Ullsperger, Alsfeld-Leusel, all of (DE)

(73) Assignee: Babcock-BSH GmbH, Bad Hersfeld (DE)

( * ) Notice: Subject to any disclaimer, the term of this patent is extended or adjusted under 35 U.S.C. 154(b) by 0 days.

(21) Appl. No.: 09/478,730

(22) Filed: Jan. 6, 2000

(51) Int. Cl.[7] .......................... B01F 13/02; B01F 17/00; B01F 3/04; B28C 5/06; C04B 38/00

(52) U.S. Cl. ......................... 516/11; 106/680; 106/778; 261/DIG. 26; 366/3; 366/102; 423/555; 516/98

(58) Field of Search .............................. 516/11, 78, 88, 516/98; 106/680, 778; 261/DIG. 26; 366/3, 102; 423/555

(56) References Cited

U.S. PATENT DOCUMENTS

| | | | | | |
|---|---|---|---|---|---|
| 1,660,402 | A | * | 2/1928 | Thomson | 516/11 X |
| 1,751,430 | A | * | 3/1930 | Thomson | 106/680 X |
| 1,769,309 | A | | 7/1930 | Rice et al. | |
| 2,097,088 | A | * | 10/1937 | Mills | 366/3 |
| 2,947,647 | A | * | 8/1960 | Hart et al. | 516/11 X |
| 3,108,148 | A | * | 10/1963 | Coyner | 261/DIG. 26 |
| 4,057,443 | A | * | 11/1977 | Stiling et al. | 366/3 X |
| 4,478,810 | A | * | 10/1984 | Bloss et al. | 423/555 |
| 5,480,597 | A | * | 1/1996 | Ishida et al. | 261/DIG. 26 |
| 5,562,892 | A | * | 10/1996 | Kirk et al. | 423/555 |
| 5,575,844 | A | * | 11/1996 | Bradshaw | 106/680 |

FOREIGN PATENT DOCUMENTS

| | | | |
|---|---|---|---|
| DE | 2 117 000 | | 10/1971 |
| DE | 35 06 209 | A | 8/1986 |
| DE | 196 51 448 | | 6/1997 |
| EP | 0 305 707 | | 3/1989 |
| EP | 0 438 772 | A | 7/1991 |
| FR | 1 231 620 | A | 9/1960 |
| FR | 2 089 457 | A | 1/1972 |

OTHER PUBLICATIONS

"Der Baustoff Gips",Stoffliche Grundlagen, Herstellung und Anwendung von Gipsbauelementen; VEB Verlag fur Bauwesen—Berlin; 1.Auflage, 5 pages (1977).

* cited by examiner

*Primary Examiner*—Richard D. Lovering
(74) *Attorney, Agent, or Firm*—Herbert Dubno

(57) ABSTRACT

A porous paste, especially a plaster paste or slurry for producing sandwich-type plasterboard, is made in a disk-shaped mixer having a rotor rotatable in a mixing chamber by introducing compressed air or other pressurizable gas through a wall or bottom segment directly into the chamber so that the incoming pressurized gas meets the mixture with a shearing action along the wall or bottom.

12 Claims, 3 Drawing Sheets

METHOD OF PRODUCING A POROUS PASTE, ESPECIALLY A POROUS PLASTER SLURRY, AND A MIXER FOR PREPARING SUCH PASTE OR SLURRY

FIELD OF THE INVENTION

The present invention relates to the production of porous pastes, especially settable pastes adapted to solidify into solid porous compositions. More particularly the invention relates to a method of making a porous plaster slurry and to a mixer for producing such pastes or slurries.

BACKGROUND OF THE INVENTION

Porous plaster slurries or pastes are used, for example, in the production of plasterboard and particularly plasterboard in which the plaster layer is sandwiched between two cardboard or paperboard sheets.

EP 0 305 702 A2 describes the production of the plaster slurry in a plaster mixer in which the settable binder in the form of gypsum powder, usually the calcium sulfate hemihydrate, is mixed with water. The plaster slurry thus produced is spread onto a continuously movable belt between two cardboard or paperboard webs. After setting of the plaster to the calcium sulfate dihydrate, the continuous strand is subdivided into boards and dried.

To produce the commercial density of the plaster which is commonly marketed, for the set and dried plasterboard, the composition is usually provided with an excess of water. The drying, therefore, must eliminate the excess water and is a step which involves high costs. To reduce the energy cost it is known to reduce the density of the plaster layer, for example by introducing a foam or, in a like manner, to produce pores in the hardenable layer. A portion of the water which is to be mixed with the plaster can then be diverted and combined with a foam concentrate, for example, a surface-active agent or tenside and foamed with air before the foam is blended into the mixture of the plaster powder and the balance of the mixing water.

In the conventional process, the foam is produced in a separate device and fed to the plaster slurry in a mixer to form pores in the resulting slurry. This, of course, requires higher capital cost for a separate apparatus for the generation of the foam as well as increased operating costs to produce the foam concentrate. The foam is partly broken down in the mixer and can give rise to large pores which are seldom desirable.

In another process known from DE 196 51 448 A1, porous gypsum is produced by introducing a foaming agent into the calcium sulfate anhydrate or hemihydrate. To produce the sandwich-type plasterboard in which the layer of plaster slurry is provided between two paper or cardboard webs, a mixer has been described in "Der Baustoff Gips", VEB Verlag für Bauwesen, Berlin, pages 86–93. This discontinuously operating mixer initially receives the water and gypsum powder is stirred into the water and a foaming agent concentrate is then metered into the composition. The mixing rotor sucks air into the mixing chamber. The efficiency of pore formation is not satisfactory in this system.

A method and apparatus (mixer) for producing porous finishing mortar or plaster is known from DE-A 21 17 000. The apparatus comprises a mixer supplied with a water feed and a device for producing fine and generally stable gas bubbles in a uniform distribution in the pasty mass of the finish-coat mortar. The device includes elements for introducing compressed gas into the mixer, the device utilizing a fritted glass porous element held by a spring ring.

Through the porous element the gas is forced into the previously formed mortar mixture. The fritted glass is located externally and is connected via openings in the housing wall with the mixing chamber. This arrangement has the drawback that the pressure on the fritted glass must be comparatively high or there is a danger of plugging the openings in the housing wall with the mortar slurry. Excessive pressure can rupture the gas bubbles downstream of the fritted glass and thus prevent uniform distribution of gas bubbles in the composition.

OBJECTS OF THE INVENTION

It is the principal object of the present invention to provide an improved method of preparing a porous paste, especially a paste for the production of gypsum board or plasterboard of the sandwich type, whereby drawbacks of earlier systems are avoided.

Another object of the invention is to provide a mixer for producing porous paste and especially a plaster slurry which is capable of ensuring a uniform distribution of gas bubbles in the paste.

Still another object of the invention is to provide a method of making a porous paste or plaster slurry with a comparatively low water content or proportion and which is particularly suitable for manufacturing plasterboard or like structural materials with a dry raw density of less than 1000 $kg/m^3$.

Finally it is an object of the invention to provide a method of mixing a plaster slurry and a mixer for producing such a slurry, whereby prior art disadvantages are avoided.

SUMMARY OF THE INVENTION

These objects are attained, in accordance with the invention, in a method of preparing a porous paste which comprises the steps of:

(a) introducing a paste-forming binder and mixing water forming a settable composition with the binder into a mixing chamber;

(b) mixing the binder and water to form a settable composition by displacing at least one mixing member in the chamber relative to chamber walls defining the mixing chamber; and (c) during displacement of the at least one mixing member introducing a pore-forming gas into the composition at a supply pressure above a pressure in the chamber through at least one fine-porous element forming at least a segment of at least one of the walls, thereby forming the porous paste.

The mixer for producing the porous paste can comprise:

a disk-shaped chamber provided with a peripheral wall and a bottom wall;

means for introducing a paste-forming binder and mixing water forming a settable composition with the binder into the mixing chamber;

a mixing disk rotatable in the chamber and formed with a peripheral array of teeth for mixing the binder and water to form a settable composition; and a fine-porous element forming at least a segment of at least one of the walls and bounding the chamber on one side and a pressurizable compartment on an opposite side for introducing a pore-forming gas into the composition at a supply pressure above a pressure in the chamber during rotation of the mixing disk, thereby forming the porous paste.

In the method of the invention for producing a porous paste or slurry, especially where a binder of gypsum or calcium sulfate is combined with mixing water, initially the binder and mixing water are-combined to form a homogeneous paste. The paste is then moved along walls of the mixing chamber and a gas is injected at an overpressure, i.e. a pressure above that which prevails in the mixing chamber, through a portion of a wall of this chamber via at least one porous element forming that wall portion of the chamber. The introduction of gas through a porous portion of the wall directly, ensures a high degree of homogeneity of the gas bubbles in the mixture of solids and water. Preferably the gas is fed into the mixture as soon as the paste has a certain homogeneity.

According to the invention, the gas is supplied to the base through at least one porous wall segment formed by a porous element of the wall. The pore width of the fine-pore wall segment should be smaller than 500 $\mu$m and preferably between 3 and 100 $\mu$m with a still more preferred range being 10 to 30 $\mu$m.

The supply of gas through a fine-porous wall segment directly utilizes in addition to the pore formation by the gas pressure, the shearing effect of the surface of the wall upon the paste which is displaced along the wall to finely distribute the gas in the paste. The shearing effect cuts the gas bubbles free at the wall and blends them into a homogeneous paste and thus ensures the homogeneous pore formation. The walls of the mixing chamber which can be provided with the porous wall segment or element, can include the peripheral wall, the roof and floor of the mixing chamber and to the extent that the paste, upon mixing, is moved along the roof or floor of the chamber.

According to a feature of the invention, the supply of gas under pressure causes the foaming of the paste and thus produces a porous paste. When the paste is used to fabricate building materials like plasterboard, the porous paste can be such that densities below 1000 kg/m$^3$ are attained. The system of the invention eliminates the need for separate foam-forming apparatus. The mixing water is in part supplied together with foam formers. The foam formers that are used can be of the type described in the publication "Aqueous Foams" (Wässrige Schäume) Spektrum der Wissenschaft, July 1986, pages 126, 127 and 132 through 138, and can include in addition smaller amounts of foam formers than are necessary when a separate foaming part of the apparatus is used. These foam formers are referred to generally here as surface-active agents or tensides.

According to a feature of the invention the supply pressure for the compressed air introduced through the porous wall segment into the mixing chamber is 0.5 to 6 bar above the pressure in that chamber.

Advantageously, the gypsum paste is produced by the mixing of the calcium sulfate hemihydrate and the mixing water which can contain foam formers, the water gypsum ratio being 0.6 to 0.8. Gypsum or plaster paste with this water/gypsum ratio can produce building materials with a density of less than 600 kg/m$^3$. For pastes capable of forming plasterboards with such low densities, separate foam generation has hitherto been required. The foam formers used for the production of a porous plaster paste can be present in relatively small quantities, namely 10 to 500 ppm, for example, about 100 g of the tenside to 1000 kg of the hemihydrate.

It has been found that gypsum recovered from flue gas cleaning operations can be used. The supply of gas through fine porous wall elements has been found to yield an especially fine distribution of bubbles in the plaster in this case. The fine distribution of the bubbles is believed to be due to the particularly fine structure of the gypsum waste product.

Especially good results for the production of porous plaster compositions can be obtained when the gypsum has a particle size distribution wherein 30 to 75% of the particles are larger than 12 $\mu$m and smaller than 48 $\mu$m.

For the production of porous gypsum in a disk-type mixer having a rotor disk, the gas is preferably admitted through at least one fine porous wall segment in the peripheral wall of the mixing housing or in the housing bottom. This ensures that at least initially a homogeneous mixture can be made from the hemihydrate and the mixing water and only then is the gas fed to the outer periphery of the disk mixer or through another fine porous wall segment. A portion of the mixing water can be combined with the tenside and added together therewith beneath the rotor disk to improve pore formation in the gypsum paste. Preferably the tenside is added at the region at which the gas is supplied.

According to another feature of the invention the supply element for the pore-forming gas, especially pore-forming air, is arranged on the walls of the mixing chamber. The porous element can be at least one fine porous wall segment of the peripheral wall of the chamber. The fine porous wall segment or wall segments formed by the gas supply elements are directed toward the mixing chamber.

According to another aspect of the invention, the mixer has a mixing chamber which is directly defined by at least one porous wall segment having a pore width of 3 to 100 $\mu$m, especially 10 to 30 $\mu$m and a preferred thickness of 2 to 10 mm when that wall segment is composed of a sintered metal. The use of a sintered metal porous structure has the advantage over other fine-pore elements that it is sufficiently stable even at a thickness of 2 to 10 mm to feed the gas under pressure into the paste. Small wall thicknesses, of course, ensure a small volume of the resulting structure. According to a feature of the invention, the element is located along the peripheral wall in a region of a first third of a rotation of the disk past the outlet for the paste. The combination of the porous element at this location with the teeth along the periphery of the rotor disk ensures that the plaster paste will be fully uniform before it leaves the mixer both in terms of the combination of the water with the powder and the distribution of the pores in the water/powder mixture.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
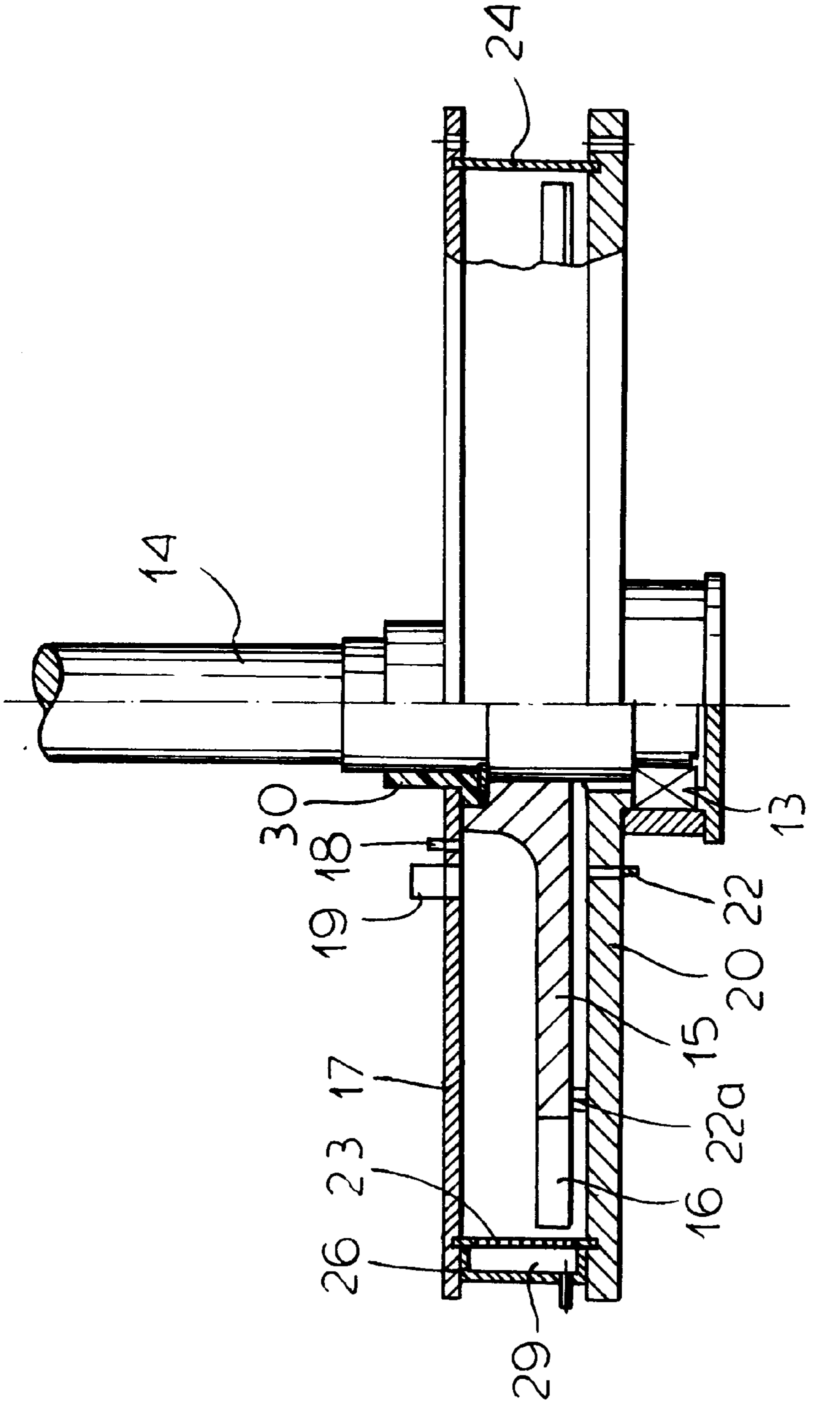
FIG. 1 is a partial vertical section through a disk mixer according to the invention as taken along the line I—I of FIG. 2.
Figure 2:
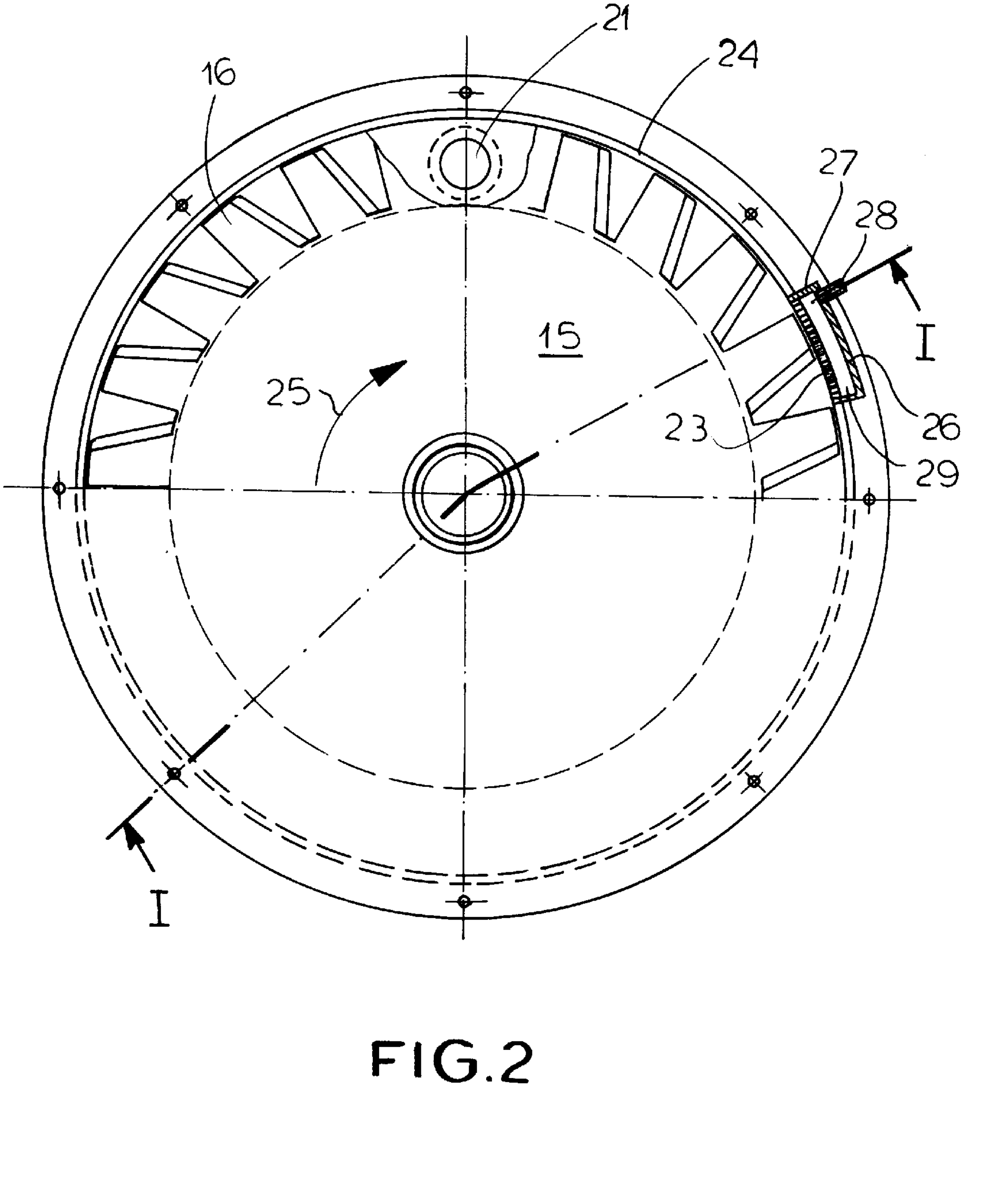
FIG. 2 is a radial section, partially broken away and with other parts in elevation through the mixer of FIG. 1.

FIGS. 1 and 2 show a disk mixer for mixing plaster powder with water and comprising a generally flat cylindrical housing with a bearing 13 in which a shaft 14 is journaled. The housing is horizontal and the shaft 14 is vertical.

The shaft 14 carries a rotor disk 15 which is formed along its periphery with large teeth 16. In the cover or roof 17 of the housing, an inlet 18 is provided to admit water to the mixing chamber within the housing, the calcium sulfate powder being admitted through an inlet 19 for solids which is spaced further from the shaft than the inlet 18.

A multiplicity of water inlets 18 can be provided in angularly equispaced relationship around the shaft 14 in a crown configuration in the preferred construction and preferably 12 such water inlets are used.

The rotor disk 15 has a thick portion or hub in the region of the shaft 14 and adjoining the zone at which the water inlets 18 are provided and this hub transitions into a thinner portion along an outer annular zone.

The bottom 20 of the housing has at least one outlet 21 in the region of the periphery of the mixing chamber. At least one water feed inlet 22 is provided in the bottom 20 inwardly of the annular region of the disk 15 formed with the teeth 16. In a preferred embodiment, four outlets 21 can be provided along a semicircle. Between the water supply inlet 22 and the annular region provided with the teeth 16, a baffle or like arrangement can be provided in the small gap between the bottom 20 of the housing and the disk 15 to define an annular labyrinth-like constriction *22a*.

At least one fine-pore wall segment 23 is provided as a feed element for the gas and this element 23 forms a segment of the housing wall 24 directly and can extend within the first third of a rotation of the disk past the outlet 21 or the last outlet 21 in the direction 25 of rotation of the disk. The housing forms the mixing chamber between the cover 17 and the disk 15, between the disk 15 and the cylindrical housing wall 24 and between the bottom 20 beneath the tooth portion 16 of the disk 15 up to constriction *22a*.

In the embodiment shown in FIGS. 1 and 2, the fine pore wall segment 23 extends over a small portion of the first third of the peripheral wall 24, namely, in the angular region between the 55th degree and the 80th degree past the last outlet 21.

The housing wall 24 is formed in the region of the fine-pore wall segment 23 with a pressure chamber 29 defined by an outer wall section 26 and radial end wall sections 27 connected to the wall element 23. The end walls 27 and section 26 are connected in a pressure-tight manner with the segment 23 and a fitting 28 is connected to the compressed air source. The fine-pore wall segment 23 is composed of sintered metal with a thickness of 6 mm and a pore width of 30 mm. In FIG. 1 between the shaft 14 and the housing cover 17, the seal 30 is provided. The diameter of the disk mixer in the embodiment shown is 650 mm. An alternative to the mixer of FIGS. 1 and 2 can have at an angle region between 90° and 180° in the direction 25 from the last outlet 21, fine-porous wall segments which can be constructed as described for the wall segment 23 and can be two in number and thus can be located in the half of the rotation of the rotor beyond the last outlet 21.

In still another alternative, the housing wall 24 can be of a double-wall construction with an inner wall which is porous and composed of sintered metal and an outer wall which defines an annular pressure chamber with the inner wall. The inner wall can be covered, for example, in the region of the outlets 21, so that it does not introduce gas into the mixture in these regions. The cover 17 and the bottom 20 can be formed with grooves receiving the peripheral wall or walls (see for example the grooves *17a* and *20a* in FIG. 3).

In operation a calcium sulfate hemihydrate is mixed with water in the mixer of FIGS. 1 and 2 with the rotor 15 operating at speeds of 100 to 300 rpm. The mixer moves the mixture outwardly so that the mixture is further blended by the teeth 16.

To avoid the collection of plaster which can set under the disk 15, a small portion of the mixing water (5 to 15%, by weight, preferably 7%) is supplied by the inlet 22 from below and flows outwardly to be distributed uniformly by the labyrinth constriction *22a* to mix with the plaster and push out any of the composition which tends to flow beneath the rotor. In this region the pressure is about 0.5 bar gauge, i.e. above the pressure within the mixing chamber above the rotor. Thus if the gauge pressure above the rotor is 0.5 bar, the water fed below the rotor is introduced at a gauge pressure of 1 bar. The compressed air is introduced at 0.05 to 2 bar above the pressure in the mixing chamber.

The hemihydrate can be calcium sulfate collected from a flue gas desulfurization plant and can have a particle size distribution in which 30 to 75% by weight of the grains are larger than 12 $\mu$m and smaller than 48 $\mu$m. The particle size distribution can be 92 to 97% greater than the 2 $\mu$m, 77 to 91% greater than 6 $\mu$m, 68 to 87% greater than 12 $\mu$m, 59 to 79% greater than 24 $\mu$m, 18 to 30% greater than 48 $\mu$m and 5 to 9% greater than 64 $\mu$m.

The hemihydrate and mixing water are combined in a water/plaster ratio (by weight) of 0.6 to 0.8 and preferably 0.7. 10 to 500 ppm of a foaming agent tenside is used, preferably by addition to the water supplied to the inlet. In a preferred case 91 ppm of the tenside is used.

The porous paste or plaster slurry which results can be used to produce plasterboard with a density of 600 kg per $m^3$. Without the incorporation of air, the density of the plasterboard would be 1000 kg per $m^3$. A metric ton of the plaster slurry is produced per hour.

Figure 3:
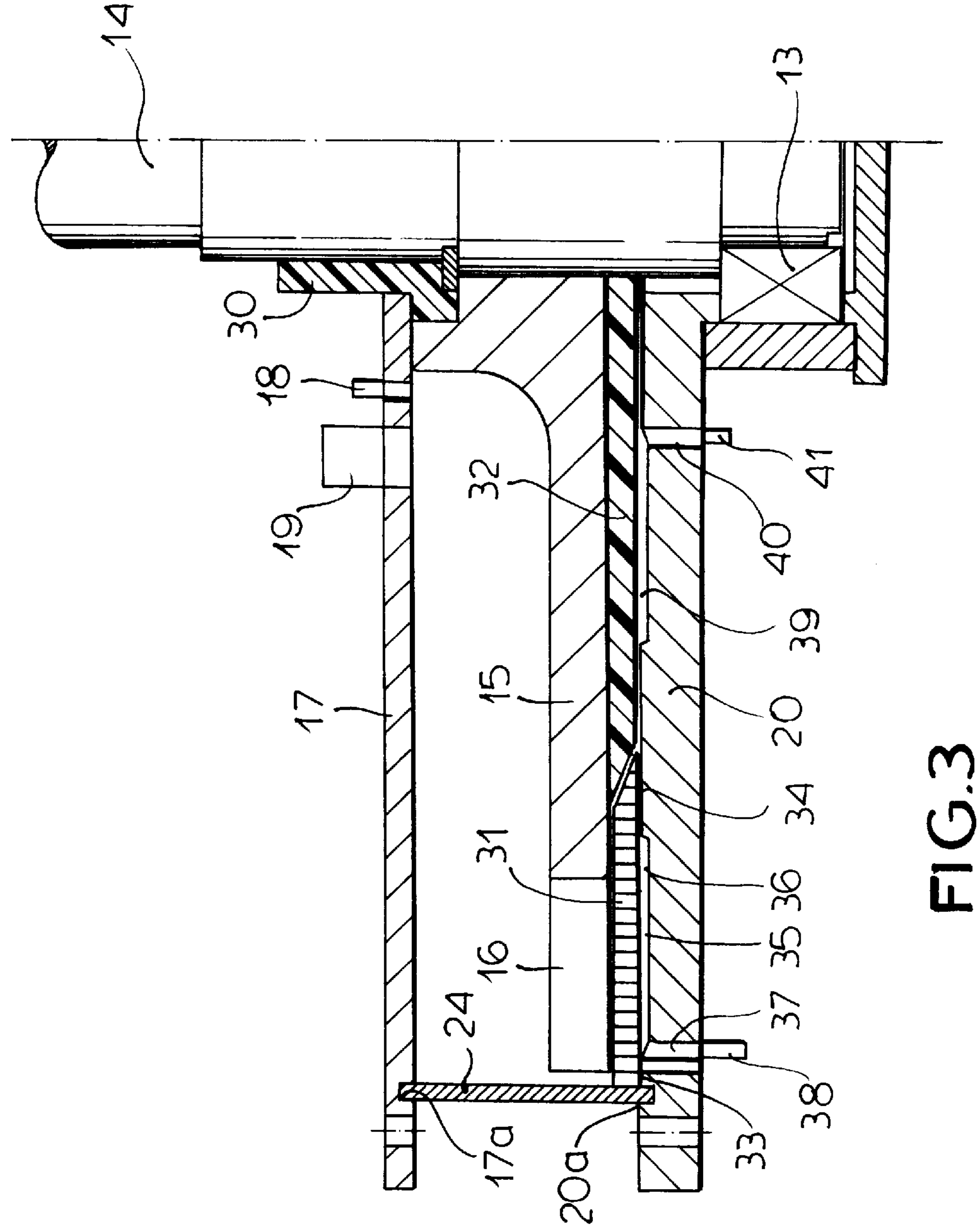
FIG. 3 is a section through another disk-shaped mixer for use in the method of the invention.

The mixer of FIG. 3 corresponds to that of FIGS. 1 and 2 except that a fine-pore bottom segment 31 is provided to feed the compressed air into the mixture. The rotor disk 15 has a plate 32 additionally affixed thereon and composed of polytetrafluoroethylene so that its wear against the housing will be reduced should the disk come to contact the housing. The porous segment 31 extends over a small region, for example 55° to 80° over the first third of the path of the rotor beyond the last outlet in the direction represented by arrow 25 of rotation of the disk.

The porous bottom segment 31 abuts the cylindrical housing wall 24 and can adjoin the latter at a seal 33 which can seal the pressurizable chamber 35 along the periphery of the segment 31 against the wall 24 and the bottom 20.

Along the radial edges of the segment 31, the latter and the disk 15 are so beveled that the edge of the disk can rest upon the segment 31. Screws countersunk in the segment 31 or extending into recesses in the disk 15 can hold the porous segment 31 in a pressure-tight manner on the housing bottom 20 and radial edges of the segment 31 can also be sealed. The segment 31 can also be beveled along its inner periphery and sealed in a pressure-tight manner at 34 with the housing bottom 20. The seal 34 can extend over the entire inner edge of segment 31 and the disk.

Below the fine-pore bottom segment 31, therefore, the pressure chamber 35 is formed in a recess 36 in the housing bottom 20 bounded by the seals previously mentioned. The recess 36 has the form of a segmental cutout. A bore 37 and a fitting 38 for connecting to a compressed-air source communicate with the chamber 35.

The radial extent of the disk and the fine-porous bottom segment 31 stretch from the housing wall 24 beneath tooth portion 16 of the rotor disk 15. Between the fine-pore bottom segment 31 and the rotor disk and the two flanks of the teeth 16, there is only a small gap which can amount to about 1 mm. Between the plate 32 and the housing bottom 20 along the central portion of the rotor disk 15 there is also only a small gap with a thickness of about 1 mm. The bottom 20 can be formed with a further recess 39 close to the hub of the rotor and connected by a bore 40 with another compressed air fitting 41. An alternative construction of this disk mixer provides the fine-porous bottom segment in an angular region of 90° to 180° from the outlet 21 in the direction of rotation 25. The fine porous bottom segment can thus lie in the half of the travel of the rotor beyond the last outlet 21.

In still another alternative of this disk mixer, the recess 36 can be covered by the housing bottom which is itself composed of sintered metal and forms the porous segment. In this case, a disk for the bottom segment and the plate 32 need not be provided.

The operation of this disk mixer corresponds to that of FIGS. 1 and 2 with the compressed air being forced into the plaster paste both through the porous segment 31 and through the gap 39. The supply of air in this region prevents the accumulation of hardenable plaster paste beneath the plate 32 and the formation of an air cushion.

In an alternative, the fitting 41 can be connected to a water line through which 5 to 15% of the mixing water, preferably 10 to 15% of the mixing water can be added with any tenside which is to be introduced. The housing wall 20 can additionally be provided with porous wall segments 23 as described in connection with FIGS. 1 and 2 through which compressed air can also be added to the mixture.

We claim:

1. A method of preparing a porous paste which comprises the steps of:

(a) introducing a paste-forming binder and mixing water forming a settable composition with said binder into a mixing chamber;

(b) mixing said binder and water to form a settable composition by displacing at least one mixing member in said chamber relative to chamber walls defining said mixing chamber; and (c) during displacement of said at least one mixing member introducing a pore-forming gas into said composition at a supply pressure above a pressure in said chamber through at least one fine-porous element forming at least a segment of at least one of said walls, thereby forming said porous paste, said mixing member being a disk rotatable about a vertical axis and provided with a peripheral array of teeth.

2. The method defined in claim 1 wherein 5 to 15% of said mixing water containing a tenside is added near said at least one fine porous element.

3. The method defined in claim 1 wherein said fine-porous element has a pore width of 3 to 100 $\mu$m and said supply pressure is 0.05 to 6 bar above said pressure in said chamber.

4. The method defined in claim 3 wherein said binder is a calcium sulfate hemihydrate byproduct from flue gas scrubbing and is mixed with said water in a water/binder ratio of 0.6 to 0.8.

5. The method defined in claim 3 wherein said pore width is 10 to 30 $\mu$m.

6. The method defined in claim 5 wherein said binder is a calcium sulfate hemihydrate and said binder is mixed with said water in a water/binder ratio of 0.6 to 0.8.

7. The method defined in claim 1 wherein said calcium sulfate hemihydrate is a byproduct from a scrubbing of flue gases.

8. The method defined in claim 1 wherein said binder has a particle distribution wherein 30 to 75% of the particles are larger than 12 $\mu$m and smaller than 48 $\mu$m.

9. The method defined in claim 1 wherein said binder is a calcium sulfate homihydrate and said binder is mixed with said water in a water/binder ratio of 0.6 to 0.8.

10. The method defined in claim 9, further comprising the step of recovering calcium sulfate hebihydrate as a byproduct from a scrubbing of flue gases to form said binder.

11. A method of preparing a porous paste which comprises the steps of:

(a) introducing a paste-forming binder and mixing water forming a settable composition with said binder into a mixing chamber;

(b) mixing said binder and water to form a settable composition by displacing at least one mixing member in said chamber relative to chamber walls defining said mixing chamber; and (c) during displacement of said at least one mixing member introducing a pore-forming gas into said composition at a supply pressure above a pressure in said chamber through at least one fine-porous element forming at least a segment of at least one of said walls, thereby forming said porous paste, said fine-porous element having a pore width of 10 to 30 $\mu$m and said supply pressure is 0.05 to 6 bar above said pressure in said chamber, said binder being a calcium sulfate hemihydrate and being mixed with said water in a water/binder ratio of 0.6 to 0.8, wherein said calcium sulfate hemihydrate being a byproduct from a scrubbing of flue gases, said binder having a particle distribution wherein 30 to 75% of the particles are larger than 12 $\mu$m and smaller than 48 $\mu$m, and said mixing member being a disk rotatable about a vertical axis and provided with a peripheral array of teeth.

12. The method defined in claim 11 wherein a tenside is added near said at least one fine-porous element.

* * * * *